(12) United States Patent
Kim

(10) Patent No.: US 7,549,155 B2
(45) Date of Patent: Jun. 16, 2009

(54) DIGITAL TELEVISION RECEIVER AND METHOD OF PROCESSING RATING REGION TABLE (RRT) INCLUDING AN EXTENDED VERSION NUMBER FIELD

(75) Inventor: Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 11/432,785

(22) Filed: May 12, 2006

(65) Prior Publication Data

US 2007/0204304 A1 Aug. 30, 2007

(30) Foreign Application Priority Data

Feb. 24, 2006 (KR) .................. 10-2006-0018480

(51) Int. Cl.
*H04H 60/09* (2008.01)
*H04H 60/46* (2008.01)
(52) U.S. Cl. .......................................... 725/28; 725/50
(58) Field of Classification Search ................... 725/50, 725/38
See application file for complete search history.

(56) References Cited

U.S. PATENT DOCUMENTS 5,663,616 A * 9/1997 Stringfellow et al. .. 318/400.04
5,828,402 A 10/1998 Collings 2005/0166227 A1 * 7/2005 Joshi ........................ 725/38

OTHER PUBLICATIONS

Advanced Television Systems Committee (ATSC) Document A/69: ATSC Recommended Practice: Program and System Information Protocol Implementation Guidelines for Broadcasters, Jun. 25, 2002, http://www.atsc.org/standards/a_69.pdf.*
"Downloadable U.S. Region Rating System White Paper," Consumer Electronics Association, Dec. 15, 2005, 7 pages.
"U.S. and Canadian Rating Region Tables (RRT) and Content Advisory Descriptors for Transport of Content Advisory Information using ATSC Program and System Information Protocol (PSIP)," ANSI/CEA Standard, ANSI/CEA-766-C, Apr. 2008, Consumer Electronics Association, 16 pages.

* cited by examiner

*Primary Examiner*—Nick Corsaro
*Assistant Examiner*—Larry Sternbane
(74) *Attorney, Agent, or Firm*—McKenna Long & Aldridge LLP (57) ABSTRACT

A digital television signal includes for use in a digital television receiver includes a rating region table carrying rating information for multiple geographical regions. The rating region table includes a version number field defining a version number of the rating region table which increments by 1 modulo 32 when any field in the rating region table changes, and an extended version number field defining an extended version number which specifies a number of times the version number of the rating region table. A combination of the version number and the extended version number indicates a total number of changes made in the rating region table, and it can be used by the digital television receiver when determining whether the rating region table is a newly-updated table. The extended version number field may be included in a table ID extension field within the rating region table which serves to establish uniqueness of the rating region table.

17 Claims, 10 Drawing Sheets

| extended_version_number | Meaning |
|---|---|
| 0x00 | 0th to 31st upgraded RRT(1st cycle) |
| 0x01 | 32nd to 63rd upgraded RRT(2nd cycle) |
| 0x02 | 64th to 95th upgraded RRT(3rd cycle) |
| 0x03 | 96th to 127th upgraded RRT(4th cycle) |
| ⋮ | ⋮ |
| 0xFF | fixed RRT |

FIG. 1

| Syntax | No. of Bits | Format |
|---|---|---|
| rating_region_table_section () { | | |
|    table_id | 8 | 0xCA |
|    section_syntax_indicator | 1 | '1' |
|    private_indicator | 1 | '1' |
|    reserved | 2 | '11' |
|    section_length | 12 | uimsbf |
|    table_id_extension { <br>      extended_version_number <br>      rating_region <br>    } | <br> 8 <br> 8 | <br> 0xFF <br> uimsbf |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    protocol_version | 8 | uimsbf |
|    rating_region_name_length | 8 | uimsbf |
|    rating_region_name_text () | var | |
|    dimensions_defined | 8 | uimsbf |
|    for(i=0; i<dimenisons_defined; i++) { | | |
|      dimension_name_length | 8 | uimsbf |
|      dimension_name_text () | var | |
|      reserved | 3 | '111' |
|      graduated_scale | 1 | Bslbf |
|      values_defined | 4 | uimsbf |
|      for(j=0; j<values_defined; j++) { | | |
|         abbrev_rating_value_length | 8 | uimsbf |
|         abbrev_rating_value_text () | var | |
|         rating_value_length | 8 | uimsbf |
|         rating_value_text () | var | |
|      } | | |
|    } | | |
|    reserved | 6 | '111111' |
|    descriptors_length | 10 | Uimsbf |
|    for(i=0; i<N; i++) { | | |
|      descriptor() | | |
|    } | | |
|    CRC_32 | 32 | rpchof |
| } | | |

FIG. 2A

| extended_version_number | Meaning |
| --- | --- |
| 0xFF | fixed RRT (ex: "rating_region" ==1(US)), 2(Canada), 3(Taiwan), 4(Korea) etc |
| 0x00 ~ 0xFE | downloadable RRT (ex: "rating_region" ==5 (US downloadable RRT) etc) |

FIG. 2B

| extended_version_number | Meaning |
| --- | --- |
| 0x00 | 0th to 31st upgraded RRT(1st cycle) |
| 0x01 | 32nd to 63rd upgraded RRT(2nd cycle) |
| 0x02 | 64th to 95th upgraded RRT(3rd cycle) |
| 0x03 | 96th to 127th upgraded RRT(4th cycle) |
| ⋮ | ⋮ |
| 0xFF | fixed RRT |

FIG. 3A

| Syntax | No. of Bits | Format |
|---|---|---|
| master_guide_table_section (){ | | |
|     table_id | 8 | 0xC7 |
|     section_syntax_indicator | 1 | '1' |
|     private_indicator | 1 | '1' |
|     reserved | 2 | '11' |
|     section_length | 12 | uimsbf |
|     table_id_extension } | 16 | 0x0000 |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     tables_defined | 16 | uimsbf |
|     for(i=0;i<dimenisons_defined;i++) { | | |
|         table_type | 16 | uimsbf |
|         reserved | 3 | '111' |
|         table_type_PID | 13 | uimsbf |
|         reserved | 3 | '111' |
|         table_type_version_number | 5 | uimsbf |
|         number_bytes | 32 | uimsbf |
|         reserved | 4 | '1111' |
|         table_type_descriptors_length | 12 | uimsbf |
|         for(k=0;k<N;k++){ | | |
|             descriptor() | | |
|         } | | |
|     } | | |
|     reserved | 4 | '1111' |
|     descriptors_length | 12 | Uimsbf |
|     for(i=0;i<N;i++) { | | |
|         descriptor() | | |
|     } | | |
|     CRC_32 | 32 | rpchof |
| } | | |

FIG. 3B

| Syntax | No. of Bits | Format |
|---|---|---|
| extended_version_descriptor() | | '111111' |
| { | | |
|     descriptor_tag | 8 | 0x?? |
|     descriptor_length | 8 | uimsbf |
|     extended_version_number | 8 | uimsbf |
|     CRC_32 | 32 | rpchof |
| } | | |

FIG. 4A

| Syntax | No. of Bits | Format |
|---|---|---|
| master_guide_table_section (){ | | |
|     table_id | 8 | 0xC7 |
|     section_syntax_indicator | 1 | '1' |
|     private_indicator | 1 | '1' |
|     reserved | 2 | '11' |
|     section_length | 12 | uimsbf |
|     table_id_extension } | 16 | 0x0000 |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     tables_defined | 16 | uimsbf |
|     for(i=0; i<dimenisons_defined; i++) { | | |
|         table_type | 16 | uimsbf |
|         reserved | 3 | '111' |
|         table_type_PID | 13 | uimsbf |
|         reserved | 3 | '111' |
|         table_type_version_number | 5 | uimsbf |
|         number_bytes | 32 | uimsbf |
|         extended_version_number | 4 | '1111' |
|         table_type_descriptors_length | 12 | uimsbf |
|         for(k=0; k<N; k++){ | | |
|             descriptor() | | |
|         } | | |
|     } | | |
|     reserved | 4 | '1111' |
|     descriptors_length | 12 | Uimsbf |
|     for(i=0; i<N; i++) { | | |
|         descriptor() | | |
|     } | | |
|     CRC_32 | 32 | rpchof |
| } | | |

FIG. 4B

| extended_version_number | Meaning |
|---|---|
| 0000 | 0th to 31st upgraded RRT(1st cycle) |
| 0001 | 32nd to 63rd upgraded RRT(2nd cycle) |
| 0010 | 64th to 95th upgraded RRT(3rd cycle) |
| 0011 | 96th to 127th upgraded RRT(4th cycle) |
| ⋮ | ⋮ |
| 1111 | fixed RRT |

DIGITAL TELEVISION RECEIVER AND METHOD OF PROCESSING RATING REGION TABLE (RRT) INCLUDING AN EXTENDED VERSION NUMBER FIELD

This application claims the benefit of the Korean Patent Application No. 10-2006-0018480, filed on Feb. 24, 2006, which is hereby incorporated by reference as if fully set forth herein.

BACKGROUND OF THE INVENTION

1. Field of the Invention

The present invention relates to a digital television signal, and more particularly, to a digital television signal for receiving program and system information protocol (PSIP) data, a method of processing the digital television signal, and a digital television receiver. Although the present invention is suitable for a wide scope of applications, it is particularly suitable for resolving errors that occur when a rating region table (RRT) is upgraded constantly (or whenever necessary) and for quickly determining whether the RRT is upgraded.

2. Discussion of the Related Art

A program and system information protocol (PSIP) is defined for parsing messages encoded in specific modes, such as MPEG-2 (moving pictures experts group ; ISO/IEC 13818-1 System), so as to provide diverse information on a particular digital broadcast program. The PSIP basically has the same structure as a PSI of the MPEG system. The PSIP may also be configured of a group of tables having the same object or purpose. Herein, each of the tables may be divided into several sections and then transmitted. Such tables include a virtual channel table (VCT), a system time table (STT), a rating region table (RRT), an extended text table (ETT), a direct channel change table (DCCT) and/or a direct channel change selection code table (DCCSCT), an event information table (EIT), a program map table (PMT), and a master guide table (MGT).

More specifically, the STT provides time information of the broadcast program, and the RRT transmits information on a specific region and an advisory committee for the program rating. The ETT provides additional channel and broadcast program description. The DCCT and the DCCSCT are related with automatic (or direct) change in channels. The EIT provides event information (e.g., title, starting time, etc.) of a virtual channel. Finally, the MGT is for managing versions and packet identifier (PID) of each of the above-mentioned tables. Particularly, among the above-mentioned tables, the RRT is configured with information of a program rating system existing in a specific region. The RRT is a standard table for a 'Content_Advisory_Descriptor', which indicates event schedules and program ratings existing in the EIT or the PMT, wherein information of each event is included.

However, in the related art digital broadcasting, a method for controlling the tables related to program rating information of the PSIP, a digital broadcast signal including the data structure of the above-mentioned tables, and a digital television receiver processing the digital broadcast signal have the following disadvantages. When a program rating standard is changed, tables related with the updated program rating information, such as the RRT, must be transmitted. A program rating standard that could be updated may be, for example, found in Downloadable U.S. Region Rating System White Paper published by Consumer Electronics Association (CEA) White Paper in Dec. 15, 2005. And, the digital television receiver should be capable of determining whether the program rating information has been changed. Yet, in the related art, the number of bits allocated for identifying the version of the tables related with the program rating information, such as the RRT, is extremely limited. Thus, the digital television receiver may not be able to discriminate between an old version of the RRT and a newer version of RRT.

SUMMARY OF THE INVENTION

Accordingly, the present invention is directed to a digital television signal for receiving program and system information protocol (PSIP) data, a method of processing the digital television signal, and a digital television receiver that substantially obviate one or more problems due to limitations and disadvantages of the related art.

An object of the present invention is to provide a digital television signal for receiving program and system information protocol (PSIP) data, a method of processing the digital television signal, and a digital television receiver that can accurately identify an update in a rating region table (RRT) without error, each time the RRT is upgraded (or updated).

Another object of the present invention is to provide a digital television signal for receiving program and system information protocol (PSIP) data, a method of processing the digital television signal, and a digital television receiver that can maintain compatibility with the original RRT.

A further object of the present invention is to provide that can use a master guide table (MGT) in order to determine an update in the RRT more quickly and easily.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television signal for use in a digital television receiver for receiving program and system information protocol (PSIP) data from a broadcast transmitter includes a rating region table which carries rating information for multiple geographical regions. The rating region table includes a first version number field and a first extended version number field. The first version number field defines a version number of the rating region table which increments by 1 modulo 32 when any field in the rating region table changes. In other words, the version number increments from 0 to 31 by 1 each time there is a change. When any field in the rating region table changes after the version number reaches 31, the version number returns to 0 and completes a cycle. The second extended version number field defines an extended version number of the rating region table which specifies a number of times the version number of the rating region table is cycled. Therefore, a total number of changes made in the rating region table can be calculated based on a combination of the version number and the extended version number.

The digital television signal may further include a master guide table which carries information related to the rating region table. The master guide table includes a table type field specifying a table type of the rating region table, a table type PID field specifying a packet identifier (PID) of the rating region table, a second version number field defining the version number of the rating region table, and a second extended version number field defining the extended version number of the rating region table.

In another aspect of the present invention, a digital television signal for use in a digital television receiver for receiving program and system information protocol (PSIP) data from a broadcast transmitter includes a rating region table carrying rating information for multiple geographical regions. The rating region table includes a version number field defining a version number of the rating region table which increments by 1 modulo 32 when any field in the rating region table changes, and an extended version number field defining an extended version number which identifies the rating region table as being one of a fixed rating region and a downloadable rating region table.

In another aspect of the present invention, a digital television receiver includes a tuner, a demodulator, a demultiplexer, a decoder, and a controller. The tuner receives a digital television signal including a rating region table carrying rating information for multiple geographical regions and a master guide table containing information related to the rating region table. The demodulator demodulates the digital television signal, and the demultiplexer demultiplexes the rating region table and the master guide table from the demodulated digital television signal. The decoder parses the master guide table which includes a version number field and an extended version number field. The version number field defines a version number of the rating region table which increments by 1 modulo 32 when any field in the rating region table changes, and the extended version number field defines an extended version number which specifies the number of times the version number is cycled. The controller then determines whether the rating region table is a newly-updated table using a combination of the version number and the extended version number. If it is, the controller generates control signals to parse the rating region table and store the rating information in a database.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is advantageous in that it can accurately detect and determine any upgraded (or updated) information even when the RRT is upgraded constantly (or whenever necessary). In addition, the present invention can maintain compatibility with the original (or pre-stored) RRT. And finally, by using a master guide table (MGT), the present invention can accurately and quickly detect and determine any update in the RRT.

For a clearer understanding of the present invention, four different embodiments of the present invention will be described herein in detail. The first embodiment describes a method of configuring a RRT syntax according to the present invention; the second embodiment describes a method of configuring a MGT syntax according to the present invention; the third embodiment describes a structure of a digital television receiver receiving and processing the RRT and MGT according to the present invention; and the fourth embodiment describes a method for controlling the digital television receiver according to the present invention.

FIRST EMBODIMENT

Figure 1:
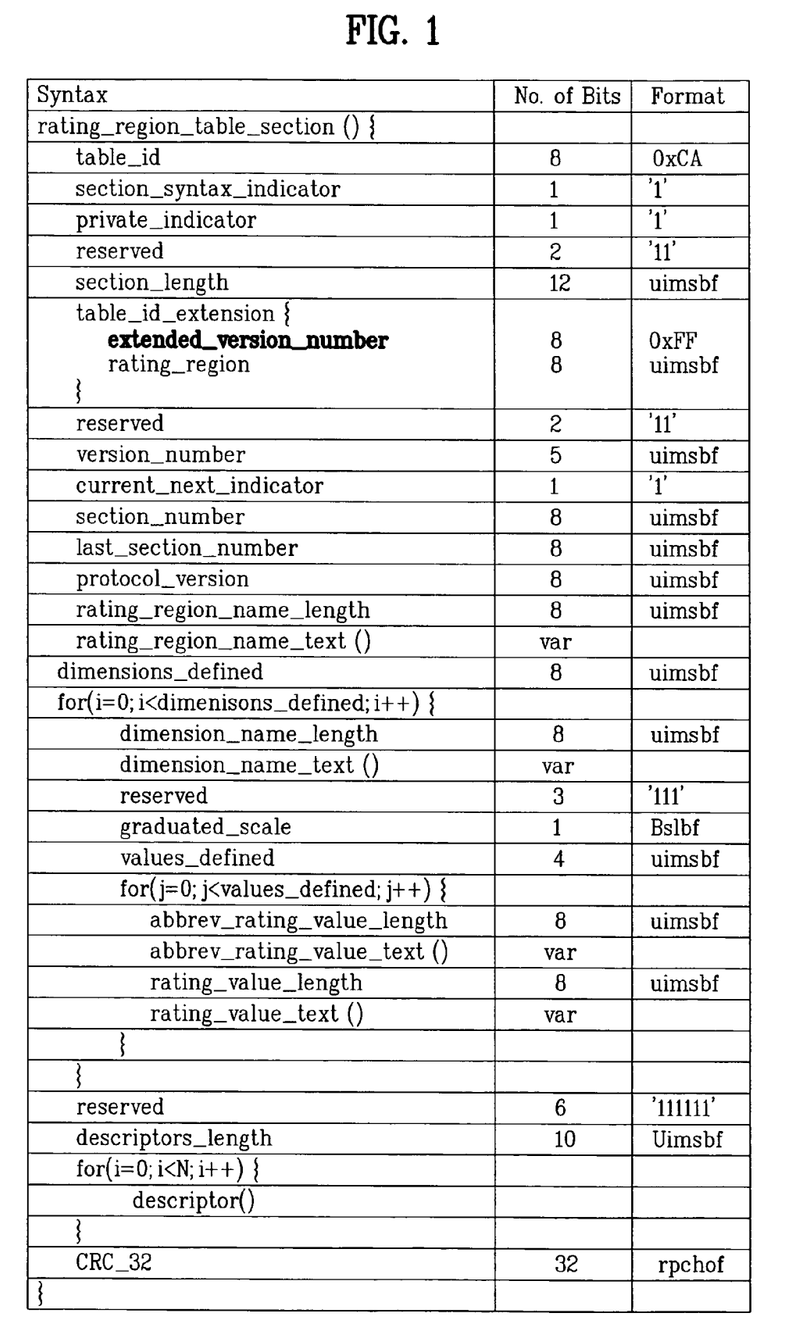
FIG. 1 illustrates an example of a rating region table (RRT) syntax according to the present invention.
Figure 2A:
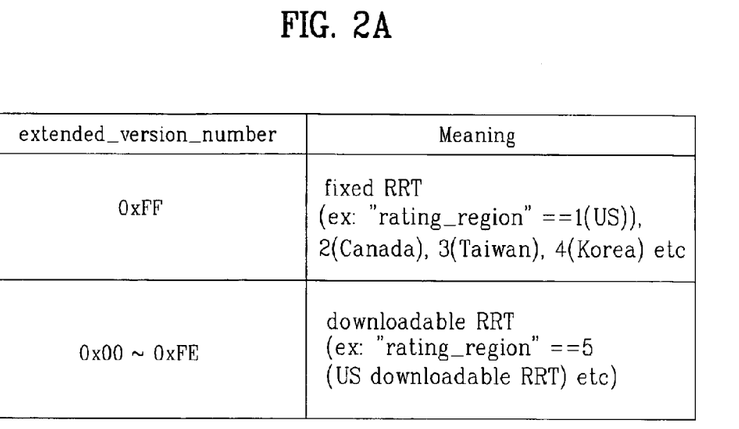
FIG. 2A illustrates an example of a table defining an "extended_version_number" field value of the RRT according to the present invention.
Figure 2B:
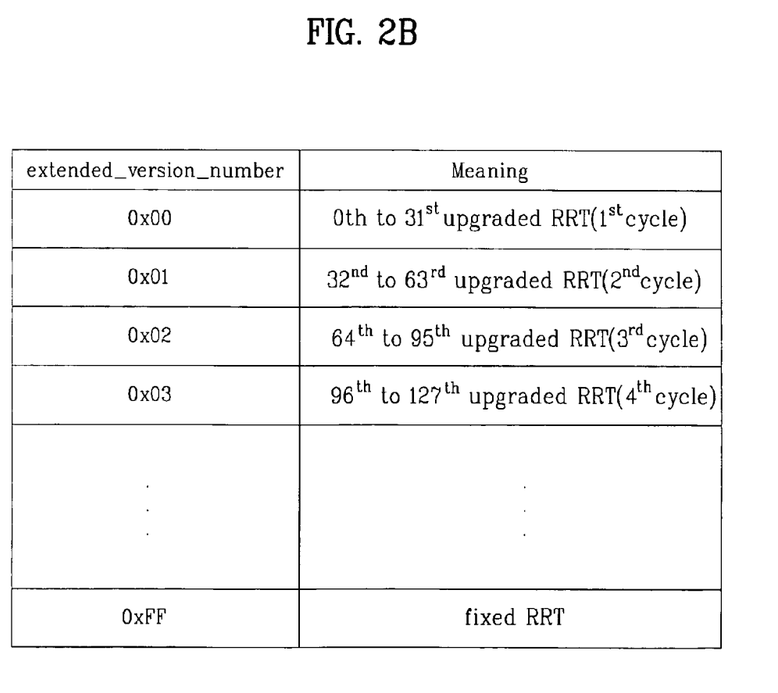
FIG. 2B illustrates another example of a table defining an "extended_version_number" field value of the RRT according to the present invention.

FIG. 1 illustrates an example of a rating region table (RRT) syntax according to the present invention. FIG. 2A illustrates an example of a table defining an "extended_version_number" field value of the RRT according to the present invention. And, FIG. 2B illustrates another example of a table defining an "extended_version_number" field value of the RRT according to the present invention. Hereinafter, a method of configuring the RRT syntax will now be described in detail with reference to FIGS. 1, 2A, and 2B. Furthermore, in order to simplify the description of the first embodiment of the present invention, each field name of the syntax will be marked with quotation marks (e.g., "XXX_YYY_ZZZ").

An "extended_version_number" field is added in the syntax, as shown in FIG. 1. Herein, the field name "extended_version_number" is only an exemplary name, and the scope of what is claimed in the present invention should be defined in accordance with the technical spirit denoted within the description of the present invention. The "extended_version_number" field, which is an extended concept of a "version_ number" field, is adopted for the purpose of accurately identifying the RRTs that have been updated (or upgraded) several times.

The "version_number" field defines a version number of the rating region table which increments by 1 modulo 32 when any field in the rating region table changes.

The "extended_version_number" field defines an extended version number of the rating region table which specifies a number of times the version number of the rating region table is cycled.

Therefore, a combination of the version number and the extended version number indicates a total number of changes made in the rating region table.

A digital television receiver can distinguish new RRT(Rating Region Table) from old RRT(Rating Region Table) easily by the combination of the version number and the extended version number.

Furthermore, the "extended_version_number" field defines an extended version number which identifies the rating region table as being one of a fixed rating region table and a downloadable rating region table.

The "extended_version_number" field may be defined under a "table_id_extension" field, as shown in FIG. 1.

The meaning corresponding to each of the values of the "extended_version_number" field will now be described with reference to FIGS. 2A and 2B. Referring to FIG. 2A, when the value of the "extended_version_number" field is '0xFF', this indicates that the corresponding RRT is a fixed RRT. The fixed RRT may signify a table in which the information of the program rating is not changed at all. Therefore, in case of the fixed RRT, once an RRT is stored, it is not required to be updated. On the other hand, as shown in FIG. 2A, when the value of the "extended_version _number" field is between '0x00' and '0xFE', this indicates that the corresponding RRT is a downloadable RRT. The downloadable RRT may signify a table in which the information of the program rating may be changed several times, whenever necessary, in a later process. Therefore, when using the downloadable RRT, the RRT version must be constantly checked and verified.

More specifically, as shown in FIG. 2B, when the "extended_version_number" field value is '0x00', for example, this indicates that that the corresponding RRT is a downloadable RRT, wherein the $0^{th}$ to $31^{st}$ RRTs have been upgraded (or updated). Since only 5 bits are allocated to the "version_number" field, the number of RRT versions cannot exceed '32'. However, by adding the "extended_version_number" field in the present invention, the problem of a limited number of RRT versions can be resolved. In other words, when one cycle of the "version_number" field value is completed (i.e., from field values '0' to '31'), the "extended_version_number" value is set to be increased by '+1'. Accordingly, even if the RRT is updated more than 32 times, the most recent RRT can be identified based upon the "extended_version_number" field value and the "version_number" field value.

The syntax configuring the RRT shown in FIG. 1 will now be described. A "table_id" field is an 8-bit field, which shall be set to 0xCA, thereby identifying this table as the rating region table (RRT). A "section_syntax_indicator" field is a 1-bit field, which shall be set to '1'. This field denotes that the section follows the generic section syntax beyond the section length field. A "private_indicator" field is a 1-bit field, which shall be set to '1'. A "section_length" field is a 12-bit field, which specifies the number of remaining bytes in this section immediately following the "section_length" field up to the end of the section. The value of "the section_length" field shall be no larger than 1021.

The "extended_version_number" field is an 8-bit field. A detailed description of this field has already been mentioned above. A "rating_region" field is an 8-bit unsigned integer number, which defines the rating region to be associated with the text in the rating_region_table_section( ). The value of this field is the identifier of this rating region, and thus this field may be used by the other tables (e.g., MGT) for referring to a specific rating region table. A "version_number" field is a 5-bit field, which indicates the version number of the Rating Region Table (RRT) identified by combination of the "table_id" field and the "table_id_extension" field. The version number shall be incremented by 1 modulo 32 when any field in this instance of the RRT changes. The value of this field shall be the same as that of the corresponding entry in MGT.

A "current_next_indicator" field is a 1-bit indicator, which is always set to '1'. A "section_number" field is an 8-bit field, which shall always be '0x00'. A "last_section_number" field is an 8-bit field, which shall always be '0x00'. A "protocol_version" field is an 8-bit field, which shall always be '0x00'.

A "rating_region_name_length" field is an 8-bit unsigned integer number, which defines the total length (in bytes) of the rating_region_name_text( ) field to follow. A "rating_region_name_text( )" field contains a multiple string structure which represents the rating region name, e.g., "U.S. (50 states +possessions)", associated with the value given by rating_region. A "dimensions_defined" field is an 8-bit field (1-255), which specifies the number of dimensions defined in the rating_region_table_section( ). Moreover, a "dimension_name_length" field is an 8-bit unsigned integer number, which defines the total length in bytes of the dimension_name_text( ) field to follow. Herein, the "dimension_name_text( )" field contains a multiple string structure which represents the dimension name being described in the loop.

A "graduated_scale" field is a 1-bit flag, which indicates whether or not the rating values in this dimension represent a graduated scale (i.e., higher rating values represent increasing levels of rated content within the dimension). Herein, value '1' means 'yes', whereas value '0' means 'no'. A "values_defined" field is a 4-bit field (1-15), which specifies the number of values defined for this particular dimension. An "abbrev_rating_value_length" field is an 8-bit unsigned integer number, which defines the total length (in bytes) of the abbrev_rating_value_text( ) field to follow. A "abbrev_rating_value_text( )" field contains a multiple string structure which represents the abbreviated name for one particular rating value. The abbreviated name for rating value '0' shall be set to a null string, i.e., "".

A "rating_value_length" field is an 8-bit unsigned integer number, which defines the total length (in bytes) of the rating_value_text( ) field to follow. A "rating_value_text( )" field contains a multiple string structure which represents the full name for one particular rating value. The full name for rating value '0' shall be set to a null string, i.e., "". A "descriptors_length" field means the length (in bytes) of all of the descriptors that follow this field. And, finally, a "descriptor( )" field means that zero or more descriptors, as appropriate, may be included.

SECOND EMBODIMENT

Figure 3A:
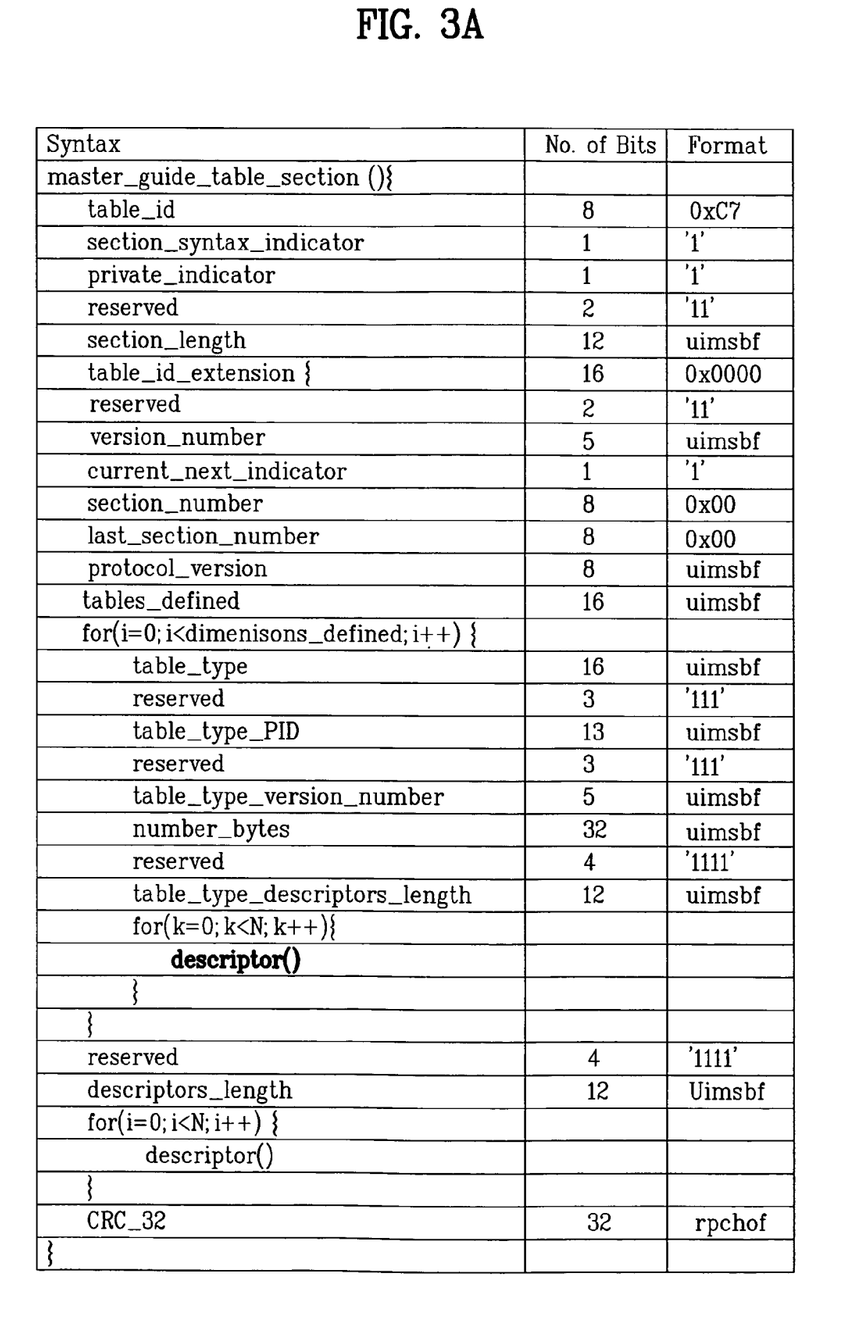
FIG. 3A illustrates an example of a master guide table (MGT) syntax according to the present invention.
Figure 3B:
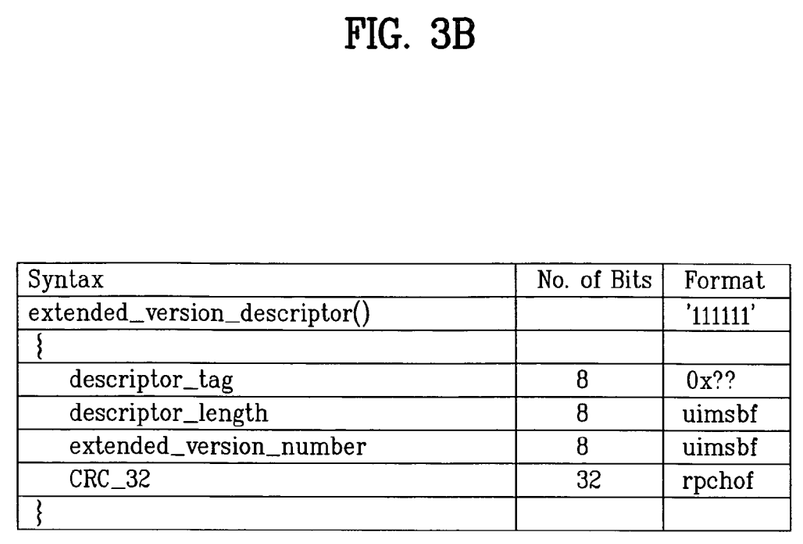
FIG. 3B illustrates an example of a newly defined descriptor in the MGT syntax of FIG. 3A.
Figure 4A:
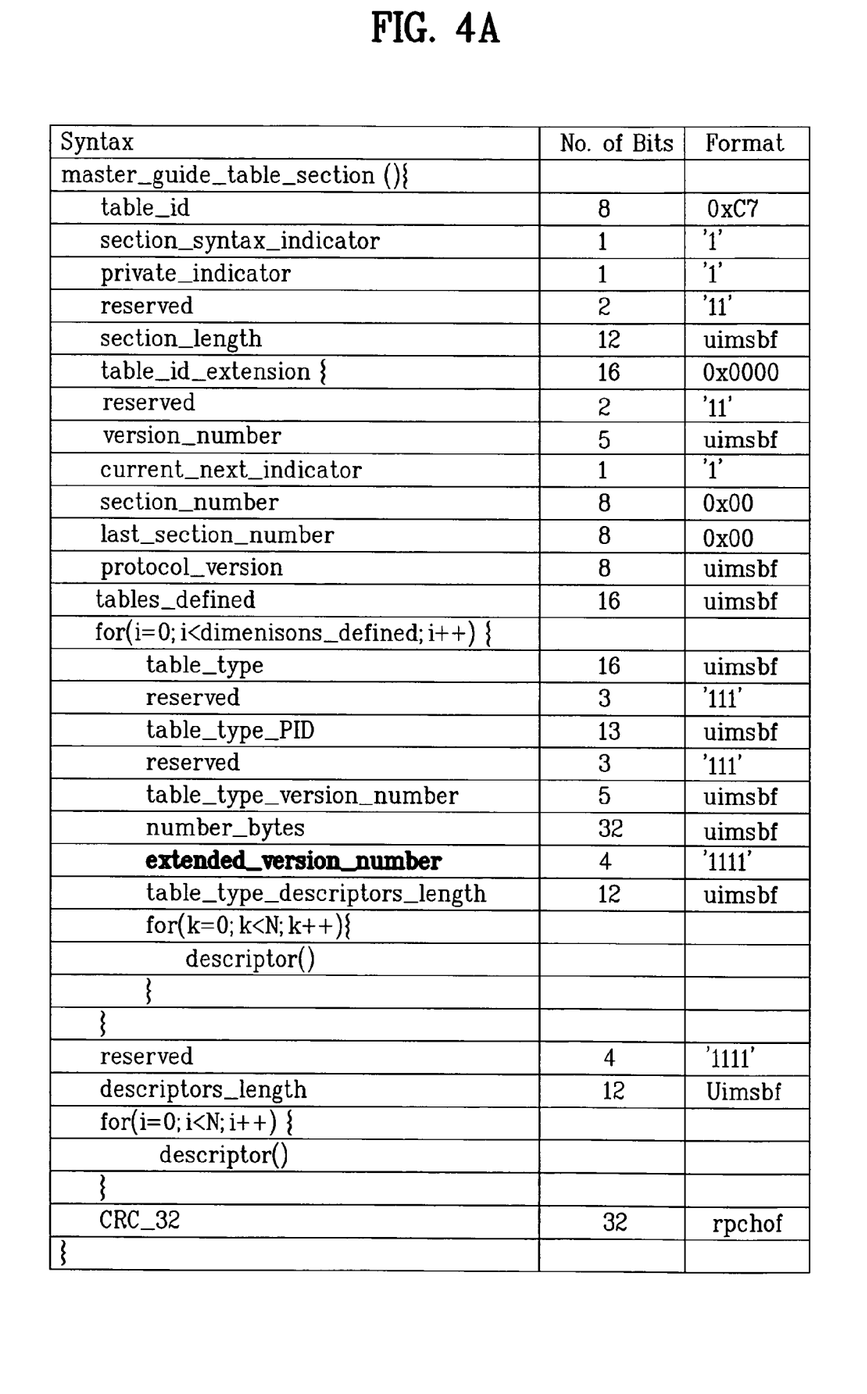
FIG. 4A illustrates another example of a master guide table (MGT) syntax according to the present invention.
Figure 4B:
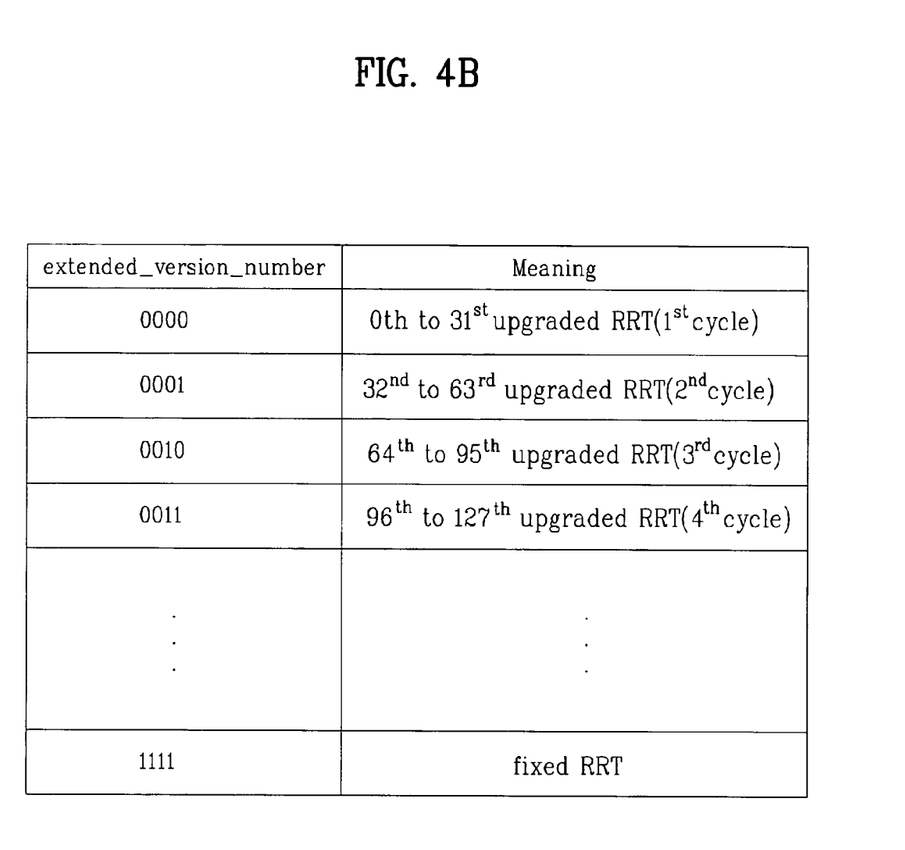
FIG. 4B illustrates an example of a table defining an "extended_version_number" field value in the MGT syntax of FIG. 4A.

FIG. 3A illustrates an example of a master guide table (MGT) syntax according to the present invention. FIG. 3B illustrates an example of a newly defined descriptor in the MGT syntax of FIG. 3A. FIG. 4A illustrates another example of a master guide table (MGT) syntax according to the present invention. And, FIG. 4B illustrates an example of a table defining an "extended_version_number" field value in the MGT syntax of FIG. 4A. Hereinafter, a method of configuring the MGT syntax will now be described in detail with reference to FIGS. 3A, 3B, 4A, and 4B.

One of the aspects of the second embodiment is that the MGT defines the information included in the above-described "extended_version_number" field. Particularly, the information included in the "extended_version_number" field according to the first embodiment of the present invention may be defined by a descriptor or a reserved field under a "tables_defined" loop of the MGT.

In a first defining method, an "extended_version_descriptor( )" shown in FIG. 3B is newly defined and added to a descriptor under the "tables_defined" loop shown in FIG. 3A. A "descriptor_tag" field shown in FIG. 3B is an 8-bit field. When the "descriptor_tag" field is given a specific value, this indicates that the corresponding descriptor is used as an 'extended_version_descriptor'. A "descriptor_length" indicates the length (bytes) of a field that is to follow. An "extended_version_number" field is an 8-bit field. When a rating region table (RRT) is updated more than 31 times, the field value is set to be increased by '+1'. Similarly, when the RRT is updated more than 63 times, the field value is set to be increased once again by '+1'. More specifically, for example, the "extended_version_number" field value and its corresponding meaning may be configured as shown in FIG. 2B.

In a second defining method, an "extended_version_descriptor( )" may be newly defined in a reserved field under a "tables_defined" loop shown in FIG. 4A. Herein, the "extended_version_number" field is a 4-bit field. When the rating region table (RRT) is updated more than 31 times, the field value is set to be increased by '+1'. Similarly, when the RRT is updated more than 63 times, the field value is set to be increased once again by '+1'.

For example, as shown in FIG. 4B, when the value of the "extended_version_number" field of FIG. 4A is '0000', this indicates that the corresponding RRT is a downloadable RRT, wherein the $0^{th}$ to $31^{st}$ RRTs have been upgraded (or updated). Also, when the value of the "extended_version _number" field is '0001', this indicates that the corresponding RRT is a downloadable RRT having the $32^{nd}$ to $63^{rd}$ RRTs upgraded. On the other hand, when the value of the "extended_version_ number" field is '1111', this indicates that the corresponding RRT is a fixed RRT. Therefore, in the second embodiment of the present invention, the most recent RRT among the many updated RRTs may be checked and identified by only parsing the MGT and without having to parse the RRT as well.

THIRD EMBODIMENT

Figure 5:
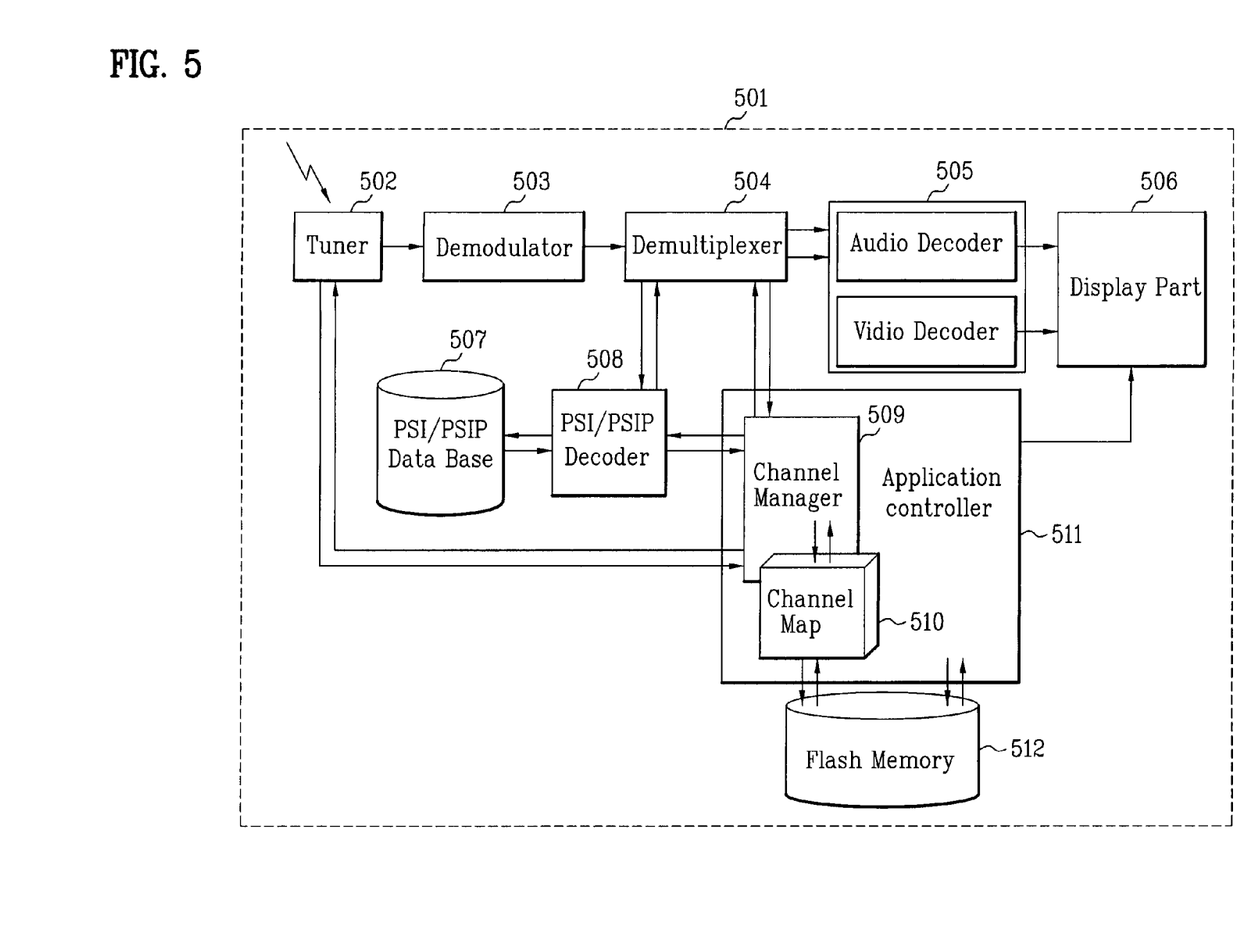
FIG. 5 illustrates a block diagram of a digital television receiver receiving and processing the RRT and MGT of a program and system information protocol (PSIP) according to the present invention.

FIG. 5 illustrates a block diagram of a digital television receiver receiving and processing the RRT and MGT of a program and system information protocol (PSIP) according to the present invention. Hereinafter, the structure of a broadcast receiver (i.e., a digital television receiver) according to the present invention will now be described in detail with reference to FIG. 5 (and supplementary reference to FIG. 1 to FIG. 4B).

A broadcast receiver 501 according to the present invention includes a tuner 502, a demodulator 503, a demultiplexer 504, an A/V decoder 505, a display part 506, a PSI/PSIP database 507, a PSI/PSIP decoder 508, a channel manager 509, a channel map 510, an application controller 511, and a flash memory 512. The flash memory 512 refers to all types of memory capable of storing data. Therefore, in some cases, a non-volatile RAM may be used as the flash memory 512.

Herein, for example, the broadcast receiver 501 may be a digital television receiver (DTV) which can receive digital broadcast programs (i.e., digital television signals). The tuner 502 may receive a digital television signal including a program and system information/program and system information protocol (PSI/PSIP) table. Herein, the PSIP table includes a rating region table (RRT), a master guide table (MGT), and so on. And, the operations of the tuner 502 may be controlled by the channel manager 509.

The tuner 502 can record the result of the received digital television signal in the channel manager 509. The demodulator 503 demodulates the tuned signal received from the tuner 502 to a vestigal side band/enhanced vestigal side band (VSB/EVSB) signal. The demultiplexer 504 demultiplexes the demodulated signal received from the demodulator 503 to audio data, video data, and PSI/PSIP table data. The demultiplexing of the audio data and video data may be controlled by the channel manager 509. On the other hand, the demultiplexing of the PSI/PSIP table data may be controlled by the PSI/PSIP decoder 508. The demultiplexed PSI/PSIP table is transmitted to the PSI/PSIP decoder 508, and the demultiplexed audio data and video data are transmitted to the A/V decoder 505. Thereafter, the A/V decoder 505 decodes the received data.

The PSI/PSIP decoder 508 parses a PSI/PSIP section and reads all remaining actual section data parts which the demultiplexer 504 did not filter during the section filtering, thereby recording the data in the PSI/PSIP database 507. The channel manager 509 refers to the channel map 510 and requests the reception of a channel related information table. Then, the channel manager 509 receives the results.

At this point, the PSI/PSIP decoder 508 controls the demultiplexing of the channel related information table and transmits an A/V PID list to the channel manager 509. The channel manager 509 uses the A/V PID to directly control the demultiplexer 504, thereby controlling the A/V decoder 505. Furthermore, the application controller 511 controls a graphical user interface (GUI) which displays the condition (or state) of the broadcast receiver system on an on-screen display (OSD).

More specifically, according to the present invention, the demultiplexer 504 uses the PID, table ID (table_id), version number (version_number), section number (section_number), and table ID extension (table_id_extension), so as to check a header part of the table being transmitted from a broadcast station. At this point, the demultiplexer 504 filters a desired table section. For example, the demultiplexer 504 filters a RRT section, a MGT section, and so on.

The PSI/PSIP decoder 508 parses the filtered RRT or MGT. Then, according to the parsing result, when a most recent (or new) downloadable RRT exists, the PSI/PSIP decoder 508 controls the demultiplexer 504, thereby transmitting the most recent (or new) downloadable RRT to the application controller 509. The application controller 509 stores the downloadable RRT received from the PSI/PSIP decoder 508 in the flash memory 512. Thereafter, the flash memory 512 is controlled so that a user can use the most recent program rating system set-up function whenever required.

The flash memory 512 may be, for example, a non-volatile RAM (NVRAM). By storing the received downloadable RRT in the flash memory 512, the RRT information can be preserved without being deleted regardless of whether the power of the broadcast receiver 501 is turned on or off. Herein, the program rating system may consist, for example of a V-CHIP function.

FOURTH EMBODIMENT

Figure 6A:
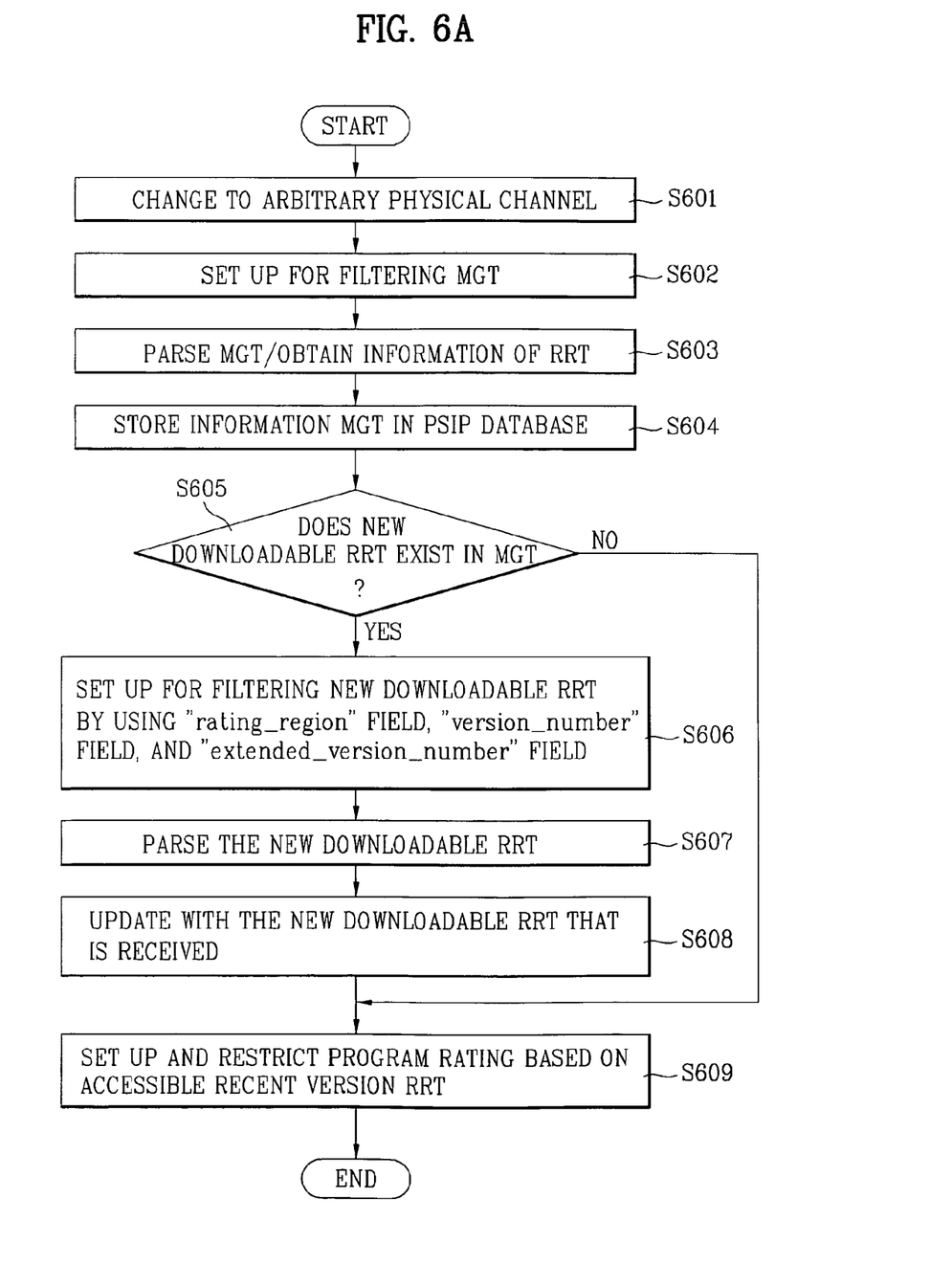
FIG. 6A illustrates an example of a flow chart showing process steps of a method for controlling a digital television receiver receiving and processing the RRT and MGT of a program and system information protocol (PSIP) according to the present invention.
Figure 6B:
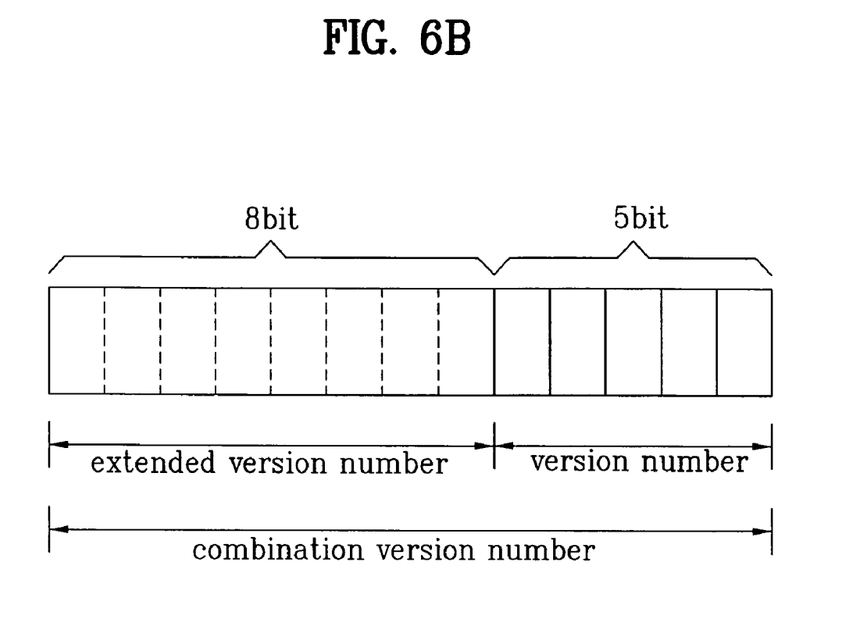
FIG. 6B illustrates an example of defining a 'combination version number' by using an "extended_version _number" field and a "version_number" field according to the present invention.
Figure 7:
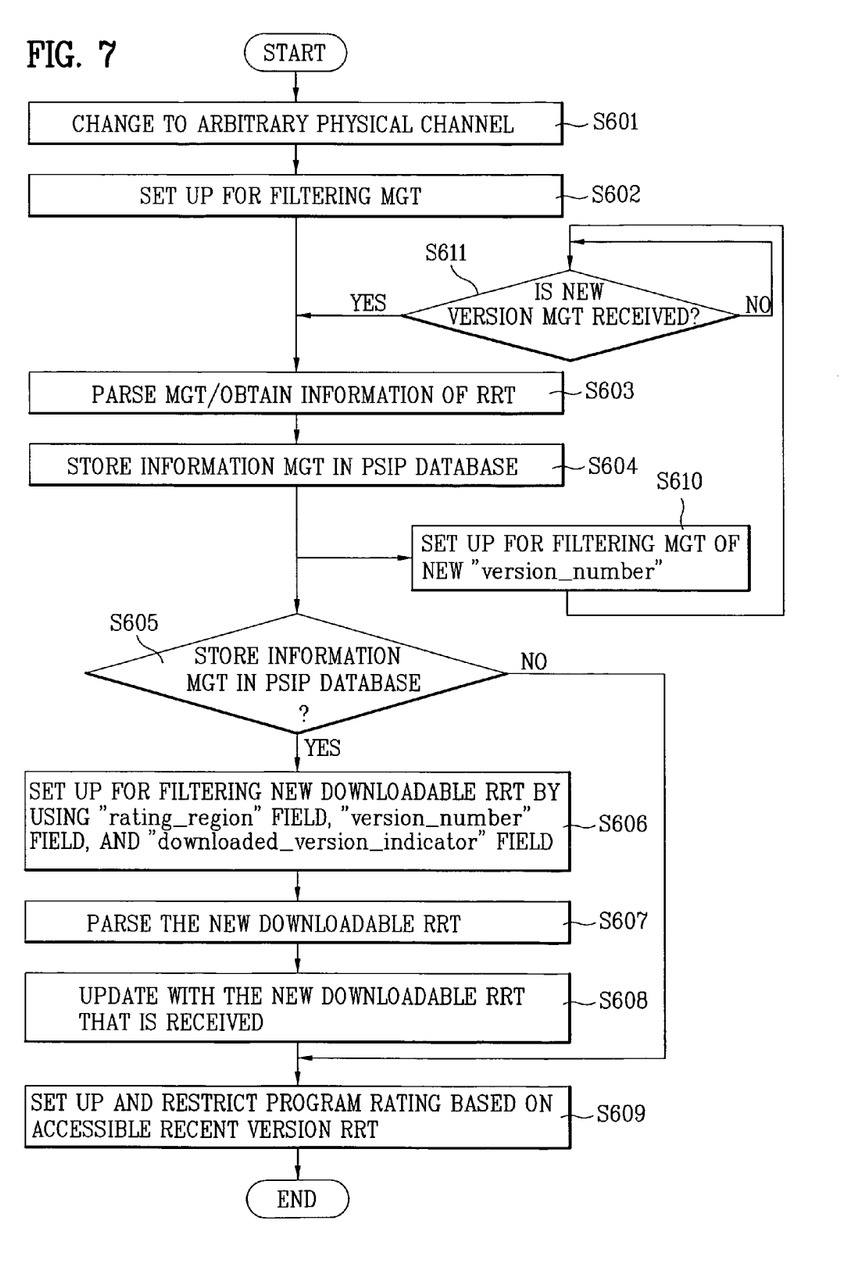
FIG. 7 illustrates another example of a flow chart showing process steps of a method for controlling a digital television receiver receiving and processing the RRT and MGT of a program and system information protocol (PSIP) according to the present invention.

FIG. 6A illustrates an example of a flow chart showing process steps of a method for controlling a digital television receiver receiving and processing the RRT and MGT of a program and system information protocol (PSIP) according to the present invention. FIG. 6B illustrates an example of defining a 'combination version number' by using an "extended_version_number" field and a "version_number" field according to the present invention. FIG. 7 illustrates another example of a flow chart showing process steps of a method for controlling a digital television receiver receiving and processing the RRT and MGT of a program and system information protocol (PSIP) according to the present invention. The method of receiving the most recent version of a downloadable RRT and updating the contents of the database with the most recent downloadable RRT will now be described with reference to FIG. 6A (and supplementary reference to FIG. 1 to FIG. 5).

When the power of the broadcast receiver is turned on, a physical channel is changed to another (arbitrary) physical channel. Then, by controlling a demultiplexer of the broadcast receiver, settings are made so that the master guide table (MGT) can be filtered. Herein, the filtering condition of the MGT may have an arbitrary "version_number" value. When the MGT is received, the PSI/PSIP decoder parses the section data of the MGT. At this point, information of the RRT is also obtained. Moreover, information on all of the tables being transmitted is included in the MGT with the exception of the STT of the PSIP. The information on the received MGT is stored in the PSI/PSIP database. Herein, the information on the received MGT also includes information on the RRT.

The PSI/PSIP decoder determines whether information on a presence of a new (or most recent version) downloadable RRT is included in the MGT (S605). More specifically, in Step 605, when a downloadable RRT matching a rating region code exists within the received MGT, and when the received downloadable RRT is pre-stored in the broadcast receiver and, at the same time, has a higher version number value than a recent downloadable RRT matching the rating region code, the PSI/PSIP decoder determines that a most recent downloadable RRT exists within the MGT. Herein, when performing a comparison operation, the version number value the "version_number" field value of the downloadable RRT in the MGT is connected with the "extended_version_number" field value defined under an 'extended_version_descriptor'. Thereafter, the calculation is performed in accordance with the connected field values.

For example, in order to verify, in accordance with the connected field values, whether the downloadable RRT is the most recent version, the "extended_version_number" field value and the "version_number" field value are added, thereby defining a concept of a 'combination version number'. More specifically, referring to FIG. 6B, when the 8-bit the "extended_version_number" field value is shifted 5 bits to the 5-bit "version_number" field value, a 13-bit 'combination version number' is defined. Thus, a wider range of RRT versions (e.g., 2^13 versions) can be marked. Evidently, the "extended_version_number" field value being configured of 8 bits is only an example. Therefore, when defining the "extended_version_number" field in a reserved field of the MGT, the field may be configured of 4 bits.

When the value of the "extended_version_number" field defined under the "extended_version_descriptor" is '0xFF' (based on FIG. 2B), the RRT is a fixed RRT instead of a downloadable RRT. Therefore, the control process moves on to Step 609. As a result of Step 605, when a new (or most recent version) downloadable RRT does not exist in the MGT, the program rating system is set-up and restricted based on the RRT pre-stored in the database of the broadcast receiver (S609). Conversely, as a result of Step 605, when a new (or most recent version) downloadable RRT exists in the MGT, the broadcast receiver is set-up in order to filter the new (or most recent version) downloadable RRT. Herein, the new downloadable RRT may be filtered by using the "rating_region" field, the "version_number" field, and the "extended_version_number" field.

The PSI/PSIP decoder parses the new downloadable RRT, which is received from the demultiplexer. The parsed RRT is stored in the PSI/PSIP database, so as to perform controlling operations in order to preserve (or maintain) the most recent downloadable RRT. In addition, the application controller may also store the RRT in the flash memory. And, at a current point, the program rating system may be set up and restricted based upon the most recent RRT. Herein, for example, the setting up and restriction of the program rating system may consist of setting up a function of locking or unlocking a particular broadcast program.

The process flow of the method of receiving the most recent version downloadable RRT and updating the contents of the database with the most recent downloadable RRT will now be described with reference to FIG. 7 (and supplementary reference to FIG. 1 to FIG. 6B). In FIG. 7, the process flow consists of preserving the new (or recent version) downloadable RRT information as the most recent version by monitoring the MGT. In comparison with the method shown in FIG. 6A, Step 610 and Step 611 are newly added.

After completing Step 604, the broadcast receiver is set up in order to filter a new "version_number" of the MGT (S610). More specifically, in order to monitor the versions of the PSIP tables being changed (or updated), the broadcast receiver controls the demultiplexer so that a condition of receiving the MGT when a version newer than the current version is received is applied as the section filtering condition of the MGT. After completing Step 610, it is determined whether a new (or recent) version of the MGT is received (S611).

More specifically, Step 611 consists of a step of monitoring whether the new version of the MGT is received through the demultiplexer, for example. In Step 611, if the new version MGT is not received, Step 611 is repeated (i.e., waiting). In other words, when a new version MGT is not continuously inputted, this may indicate that the new version MGT is not being received. Conversely, in Step 611, if the new MGT is received, the process starting from Step 603 is repeated. For example, when the version of a particular table of the PSIP is changed from a broadcast station, the "table_type_version_number" under the "tables_defined" field is also changed. Therefore, if the "version_number" field of the MGT is also changed, this may indicate that the new version MGT is received.

As described above, the change in the MGT version may indicate a change in the version of the downloadable RRT or a change in the version of another PSIP table. In case the downloadable RRT version is changed, by performing Step 605, the reception of the downloadable RRT having its version changed may be detected. Thereafter, Steps 606, 607, 608, and 609 are performed.

When the version of another PSIP table is changed and not the version of the downloadable RRT, the broadcast receiver may receive the corresponding PSIP table by controlling the demultiplexer and may update the database by using the received PSIP table. The information indicating that the version of the downloadable RRT is not changed may be detected during Step 605. In this case, Step 609 is performed right after Step 605.

As described above, the digital television signal for receiving program and system information protocol (PSIP) data, the method of processing the digital television signal, and the digital television receiver according to the present invention have the following advantages. Each time the contents of a rating region table (RRT) is changed (i.e., when the RRT is updated or upgraded, or when the version is changed) and received, the present invention can accurately determine such change. In addition, the present invention can identify a fixed RRT and a downloadable RRT, thereby being able to determine whether any one of the fixed RRT and the downloadable RRT is received or not. Accordingly, a program rating system may be operated and managed more quickly, thereby enhancing the efficiency in the usage of the memory.

Moreover, by including the information on a recent version of the RRT in a header part of a table, the most recent version of the RRT may be detected during a section filtering. Furthermore, by including the information on the version of a downloadable RRT in a master guide table (MGT), the present invention can decide more quickly whether the RRT has been received. Also, the version of the downloadable RRT can be monitored. Finally, a descriptor of the RRT and the MGT may also be used. Therefore, compatibility with the method of processing the original (or pre-existing) RRT or MGT.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital television receiver for receiving program and system information protocol (PSIP) data from a digital television signal that includes a rating region table carrying rating information for multiple geographical regions, the receiver comprising:
    a decoder configured to parse a first version number field defining a first version number of the rating region table which increments by 1 modulo 32 when any field in the rating region table changes;
    the decoder configured to parse a first extended version number field defining a first extended version number of the rating region table which specifies a number of times the version number of the rating region table is cycled; and
    a controller arranged to generate control signals to store the rating region table when the rating region table is determined to be a new rating region table using a combination of the first version number and the first extended version number parsed by the decoder.

2. The digital television receiver of claim 1, wherein a combination of the version number and the extended version number indicates a total number of changes made in the rating region table.

3. The digital television receiver of claim 1, wherein the first extended version number field is included in a table identification (ID) extension field within the rating region table which serves to establish uniqueness of the rating region table.

4. The digital television receiver of claim 1, wherein the digital television signal includes a master guide table carrying information related to the rating region table, the digital television receiver comprising:
    the decoder configured to parse a table type field specifying a table type of the rating region table;
    the decoder configured to parse a table type PID field specifying a packet identifier (PID) of the rating region table;
    the decoder configured to parse a second version number field defining a second version number of the rating region table; and
    the decoder configured to parse a second extended version number field defining a second extended version number of the rating region table.

5. The digital television receiver of claim 4, wherein the second extended version number field is included in a descriptor within the master guide table.

6. A digital television receiver for receiving program and system information protocol (PSIP) data from a digital television signal that includes a rating region table carrying rating information for multiple geographical regions, the digital television receiver comprising:
    a decoder configured to parse a first version number field defining a first version number of the rating region table which increments by 1 modulo 32 when any field in the rating region table changes; and
    the decoder configured to parse a first extended version number field defining a first extended version number which identifies the rating region table as being one of a fixed rating region table and a downloadable rating region table.

7. The digital television receiver of claim 6, wherein the first extended version number specifies a number of times the version number of the rating region table is cycled when the rating region table is a downloadable rating region table.

8. The digital television receiver of claim 7, wherein a combination of the first version number and the first extended version number indicates a total number of changes made in the rating region table when the rating region table is a downloadable rating region table.

9. The digital television receiver of claim 6, wherein the first extended version number field is included in a table identification (ID) extension field within the rating region table which serves to establish uniqueness of the rating region table.

10. The digital television receiver of claim 6, wherein the digital television signal includes a master guide table carrying information related to the rating region table, the digital television receiver comprising:
    the decoder configured to parse a table type field specifying a table type of the rating region table;
    the decoder configured to parse a table type PID field specifying a packet identifier (PID) of the rating region table;
    the decoder configured to parse a second version number field defining a second version number of the rating region table; and the decoder configured to parse a second extended version number field defining a second extended version number of the rating region table.

11. The digital television receiver of claim 10, wherein the second extended version number field is included in a descriptor within the master guide table.

12. A method of processing a digital television signal in a digital television receiver, the method comprising:
receiving a digital television signal including a rating region table carrying rating information for multiple geographical regions and a master guide table carrying information related to the rating region table;
parsing the master guide table, the parsed master guide table including a version number field defining a version number of the rating region table which increments by 1 modulo 32 when any field in the rating region table changes,
parsing the master guide table, the parsed master guide table including an extended version number field defining an extended version number which specifies a number of times the version number is cycled; and
storing the rating region table when the rating region table is determined to be a new rating region table using a combination of the version number and the extended version number defined in the master guide table.

13. The method of claim 12, wherein the combination of the version number and the extended version number indicates a total number of changes made in the rating region table.

14. The method of claim 12, wherein the extended version number field is included in a descriptor within the master guide table.

15. A digital television receiver, comprising:
a tuner arranged to receive a digital television signal including a rating region table carrying rating information for multiple geographical regions and a master guide table carrying information related to the rating region table;
a demodulator arranged to demodulate the digital television signal;
a demultiplexer arranged to demultiplex the rating region table and the master guide table from the digital television signal;
a decoder arranged to parse the master guide table, the parsed master guide table including a version number field defining a version number of the rating region table which increments by 1 modulo 32 when any field in the rating region table changes, and an extended version number field defining an extended version number which specifies a number of times the version number is cycled; and
a controller arranged to generate control signals to store the rating region table when the rating region table is determined to be a new rating region table using a combination of the version number and the extended version number defined in the master guide table.

16. The digital television receiver of claim 15, wherein the combination of the version number and the extended version number indicates a total number of changes made in the rating region table.

17. The digital television receiver of claim 15, wherein the extended version number field is included in a descriptor within the master guide table.

* * * * *